United States Patent
Chen et al.

(10) Patent No.: US 10,275,389 B2
(45) Date of Patent: Apr. 30, 2019

(54) USB TYPE-C ADAPTER MODULE AND ACTIVATING METHOD FOR THE SAME

(71) Applicant: Delta Electronics, Inc., Taoyuan (TW)

(72) Inventors: Tien-He Chen, Taoyuan (TW); Che-Min Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 123 days.

(21) Appl. No.: 15/415,457

(22) Filed: Jan. 25, 2017

(65) Prior Publication Data

US 2017/0351638 A1 Dec. 7, 2017

(30) Foreign Application Priority Data

Jun. 3, 2016 (TW) .............................. 105117592 A

(51) Int. Cl.
*G06F 13/42* (2006.01)
*G06F 13/38* (2006.01)
*G06F 13/40* (2006.01)

(52) U.S. Cl.
CPC ........ *G06F 13/4282* (2013.01); *G06F 13/385* (2013.01); *G06F 13/4022* (2013.01); *Y02D 10/14* (2018.01); *Y02D 10/151* (2018.01)

(58) Field of Classification Search
None
See application file for complete search history.

(56) References Cited

U.S. PATENT DOCUMENTS

| 2015/0346790 A1* | 12/2015 | Talmola | G06F 1/266 710/104 |
| 2016/0241148 A1* | 8/2016 | Kizilyalli | H05K 5/0247 |
| 2016/0335221 A1* | 11/2016 | Zhu | G06F 13/36 |
| 2017/0038810 A1* | 2/2017 | Ueki | G06F 21/44 |
| 2017/0293347 A1* | 10/2017 | Wood, III | G06F 13/4282 |
| 2017/0294832 A1* | 10/2017 | Aoki | H02H 1/003 |
| 2017/0344098 A1* | 11/2017 | Abu Hilal | G06F 1/3287 |

FOREIGN PATENT DOCUMENTS

| CN | 105608035 A | 5/2016 |
| TW | M491982 U | 12/2014 |
| TW | M517848 U | 2/2016 |

* cited by examiner

*Primary Examiner* — Henry Tsai
*Assistant Examiner* — Christopher A Bartels
(74) *Attorney, Agent, or Firm* — Muncy, Geissler, Olds & Lowe, P.C.

(57) ABSTRACT

A module comprising a USB Type-C receptacle, a USB Type-C plug and a logic unit is disclosed. A power pin of the receptacle is connected with another power pin of the plug via a switch. A CC pin of the receptacle is connected to ground through a pull-down resistance. Another CC pin of the plug is connected to the logic unit through a pull-up resistance. The module connects with a power source device being a power sink-role in order to receive a source capability of the power source device, then turns on the switch and transforms itself to a power source-role. The module connects to a DRP device afterward being the power source-role to act for the power source device and perform a USB PD communication with the DRP device.

18 Claims, 7 Drawing Sheets

USB TYPE-C ADAPTER MODULE AND ACTIVATING METHOD FOR THE SAME

BACKGROUND OF THE INVENTION

1. Field of the Invention

The invention relates to USB Type-C, and in particular to a USB Type-C adapter module and its activating method.

2. Description of Prior Art

Recently there has been rapid developments in the technology for USB Type-C interface. Since the USB Type-C interface can support a new USB power transmission standard named USB Power Delivery (USB PD), there're tens of thousands of electronic devices that start to use the USB Type-C interface as a substitute for traditional USB2.0 and USB3.0 interfaces.

The producers of these electronic devices may embed them with Vendor Defined Messages (VDMs) based on USB PD standard. The VDMs may be used by the producers to recognize their products, and to restrict some of these products' functions (for example, quick charge mode).

There are some electronic devices on the market having specific VDM which performs particular actions to satisfy specific requirements in order to implement full USB PD function. If a power source device (such as a power supply) connects to one of these types of electronic devices through a USB Type-C connector and cannot recognize the specific VDM, the power source device cannot get the specific requirement of the electronic device. This then results in a failure to perform a USB PD communication with the electronic device according to the specific requirement.

Presently, when faced the aforementioned problems, an end-user needs to return the power source device to the producer for firmware updating, or purchase a new edition of the power source device, otherwise the end-user is not able to use full USB PD function of these electronic devices.

SUMMARY

Herein describes a USB Type-C adapter module and its activating method, which may act for and assist with a power source device to confirm a requirement of a Dual Role Port (DRP) device, and to provide suitable power to the DRP device.

According to one aspect of the present invention, there is provided a USB Type-C adapter module, comprising:

a USB Type-C receptacle comprising a first power pin and a first configuration channel pin;

a USB Type-C plug comprising a second power pin, a second configuration channel pin, and a USB2.0 data pin;

a logic unit connected to the second configuration channel pin and the USB2.0 data pin;

a pull-up resistance connected to the logic circuit and the second configuration channel pin;

a first pull-down resistance connected to the first configuration pin and configured to ground the first configuration pin;

a switch connected to the first power pin and the second power pin, the switch being configured to be actuated and transform the USB Type-C adapter module to a power sink role or a power source role;

wherein the USB Type-C adapter module is configured to connect with a power source device via the USB Type-C receptacle and, as the power sink role, receive a source capability from the power source device, and wherein the USB Type-C adapter module is further configured to connect with a dual role port (DRP) device via the USB Type-C plug and, as the power source role, perform a USB power delivery (PD) communication with the DRP device.

According to an embodiment herein described, the USB Type-C adapter module obtains the source capability of the power source device after being activated, and transforms itself to a power source-role, and acts for the power source device to perform the USB PD communication with the connected DRP device. The USB Type-C adapter module further performs message exchanging with the DRP device via the internal logic unit, so as to assist the power source device to confirm the practical requirement of the DRP device.

The logic unit may be more easily updated than the power source device and so the end-user can update the logic unit to overcome the problem that the power source device does not have the capability to recognize the specific VDM of the DRP device.

DETAILED DESCRIPTION OF THE EMBODIMENTS

Figure 1:
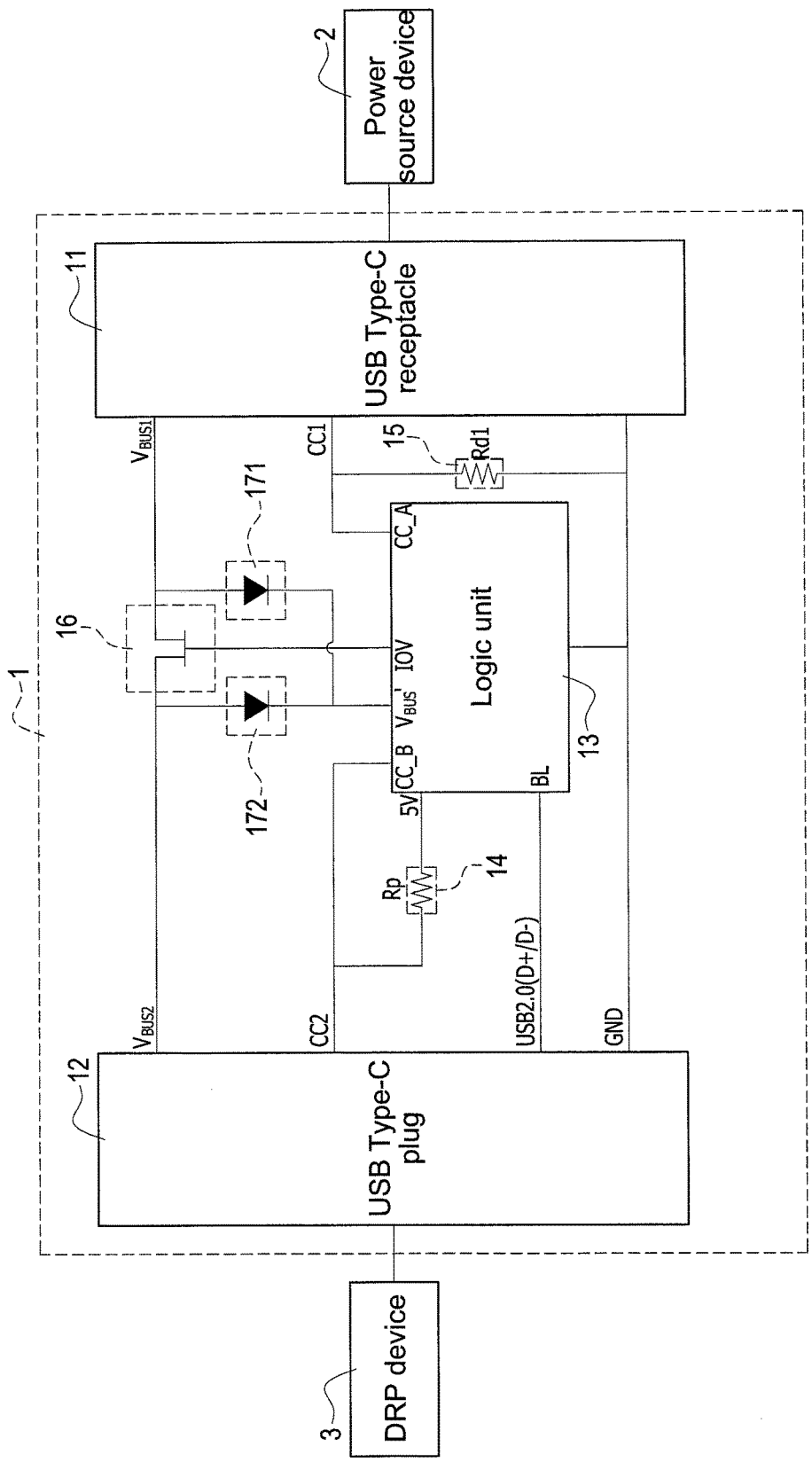
FIG. 1 shows a circuit diagram of an adapter module according to a first embodiment of the present invention.

In cooperation with the attached drawings, the technical contents and descriptions of the embodiments of the present invention are herein provided Referring to FIG. 1, a USB Type-C adapter module (referred to as an adapter module 1 hereinafter) is used to connect with devices such as source devices, sink devices and dual role port (DRP) devices, which may support USB Type-C interfaces.

As shown, the adapter module 1 comprises a USB Type-C receptacle 11 (referred to as the receptacle 11 hereinafter), a USB Type-C plug 12 (referred to as the plug 12 hereinafter), and a logic unit 13. Specifically, the adapter module 1 is used to connect with an external power source device 2 via the receptacle 11, and also connect with an external DRP device 3 or a sink device (not shown) via the plug 12. In one aspect, the adapter module 1 acts for the power source device 2 (such as a power supply) to provide output power to the DRP device 3 (such as a laptop computer or a tablet computer) or the sink device (not shown), according to the USB PD standard.

Shown in FIG. 1, the receptacle 11 comprises a first power pin (VBUS1) and a first configuration channel pin (CC1), wherein the CC1 pin is connected to ground via a first pull-down resistance (Rd1) 15. The plug 12 comprises a second power pin (VBUS2), a second configuration channel pin (CC2) and a USB2.0 data pin (D+/D−), wherein the CC2 pin is connected to the logic unit 13 via a pull-up resistance (Rp) 14. The VBUS pins, the CC pins and the USB2.0 data pin may be basic pins of the USB Type-C interface.

The adapter module 1 further comprises a switch 16 connected with the VBUS1 pin and the VBUS2 pin. If the switch 16 is turned off, the VBUS1 pin and the VBUS2 pin are disconnected and the receptacle 11 cannot transmit the power, which it receives from the power source device 2, to the plug 12. If the switch 16 is turned on, the VBUS1 pin and the VBUS2 pin are connected and the adapter module 1 may receive the power from the power source device 2 (via the receptacle 11), and transmit the received power to the plug 12 via the VBUS1 pin and the VBUS2 pin, and further output the power to the DRP device 3 connected to the plug 12.

The switch 16 may be a metal-oxide-semiconductor field effect transistor (MOSFET) controlled by the logic unit 13 as shown in FIG. 1, but is not limited thereto. Other switching devices & mechanisms, and control methods may be implemented, as known by a Skilled Person in the Art.

The logic unit 13 is connected with the VBUS1 pin and the VBUS2 pin and is configured to receive an initial power from the receptacle 11 or the plug 12. The logic unit 13 is also connected with the CC1 pin and the CC2 pin, and is configured to process USB Type-C interface related messages output by the power source device 2 and the DRP device 3.

The adapter module 1 may further comprise a first diode 171 and a second diode 172. The VBUS1 pin may be connected to the logic unit 13 via the first diode 171, and the VBUS2 pin may be connected to the logic unit 13 via the second diode 172. If the switch 16 is turned off and an initial power is received by the receptacle 11, the initial power may be transmitted to the logic unit 13 via the VBUS1 pin and the first diode 171. The initial power may not flow to the plug 12 since the switch 16 is turned off and the second diode 172 blocks reverse bias flow through to the VBUS2 pin of the plug 12. If the initial power is received via the plug 12, and the switch 16 is turned off, the initial power may be transmitted to the logic unit 13 via the VBUS2 pin and the second diode 172, and would be blocked by the reverse bias of the first diode 171 to flow to the VBUS1 pin of the receptacle 11.

As shown in the Figures, the logic unit 13 is connected to the USB2.0 data pin of the plug 12. When the adapter module 1 is connected to the DRP device 3 via the plug 12, a firmware of the logic unit 13 may be updated by the DRP device 3 through a device firmware upgrade (DFU) mode defined under USB2.0 protocol. If the DRP device 3 is adopted with a specific vendor defined message (VDM) that neither of the adapter module 1 and the power source device 2 can recognize, an end-user can directly update the firmware of the logic unit 13 to provide the adapter module 1 with capability to recognize the VDM adopted by the DRP device 3. This enables the power source device 2 to more precisely understand the requirements of the DRP device 3, and to be able to provide a suitable power output.

According to a method of operation, the adapter module 1 must be connected to the power source device 2 first via the receptacle 11. Specifically, the power source device 2 may detect the first pull-down resistance 15 upon the CC1 pin being connected to the receptacle 11, and accordingly then recognize the adapter module 1 being a power sink (to receive power) due to the first pull-down resistance 15. The power source device 2 may then start to output an initial power to the adapter module 1 which transmits via the VBUS1 pin to activate the logic unit 13.

After the logic unit 13 is activated, the adapter module 1 further acts as a power sink to receive a source capability of the power source device 2. The logic unit 13 may turn the switch 16 on in order to enable the connection between the VBUS1 pin and the VBUS2 pin, so as to transform the adapter module 1 from a power sink role to a power source role. The adapter module 1 may then be used to connect with the DRP device 3 and act as a power source to the DRP device 3.

The DRP device 3 may detect the pull-up resistance 14 upon the CC2 pin being connected with the plug 12, and recognize the adapter module 1 as a power source due to the pull-up resistance 14. Accordingly, the adapter module 1 may operate as a power source role and act for the power source device 2, and perform a USB PD communication with the DRP device 3. Specifically, the adapter module 1 acts for the power source device 2 by the operations of the logic unit 13, and may transmit to the DRP device 3 the source capability of the power source device 2. The adapter module 1 may also receive from the DRP device 3 the VDM adopted by the DRP device 3.

The adapter module 1 is configured to process and analyze the VDM adopted by the DRP device 3 using the logic unit 13, and communicate to the power source device 2 with a processing result after recognizing the practical requirements of the DRP device 3 based on the VDM. Through this operation, the power source device 2 may provide suitable power output according to the processing result, and satisfy the practical requirements of the DRP device 3.

Figure 2:
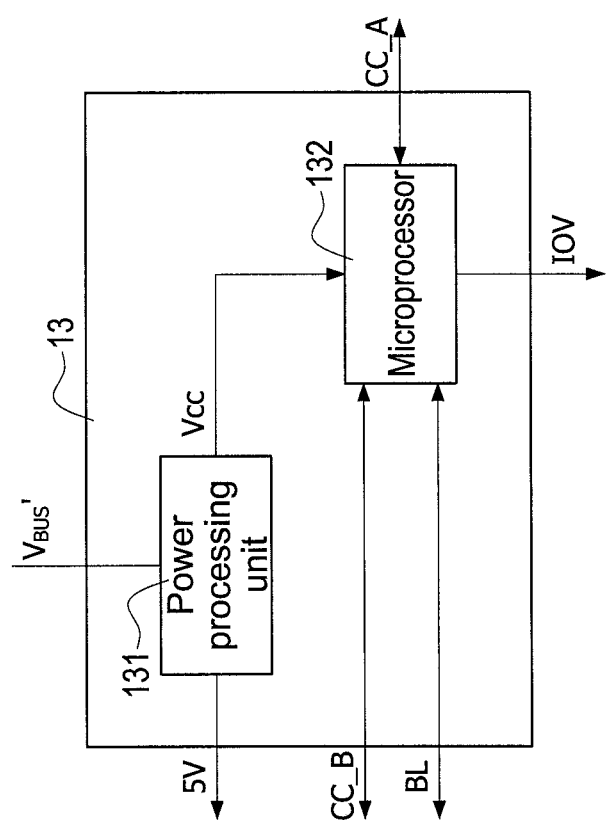
FIG. 2 shows a circuit diagram of a logic unit of the first embodiment of the present invention.

Referring to FIG. 1 and FIG. 2, the logic unit 13 comprises a power processing unit 131 and a microprocessor 132. The microprocessor 132 is connected to the CC1 pin of the receptacle 11 via CC_A; connected to the CC2 pin of the plug 12 via CC_B; connected to the USB2.0 data pin of the plug 12 via BL; and connected to the switch 16 via IOV. The microprocessor 132 is further connected to the power processing unit 131 to receive from the power processing unit 13 a working power for its operations.

Connecting the adapter module 1 is with the DRP device 3 via the plug 12 can put the microprocessor 132 of the logic unit 13 in the DFU mode, and a firmware updating action can be performed to update the firmware of the microprocessor 132 by the DRP device 3 via the USB2.0 data pin of the plug 12. By using the DFU mode to update the firmware, the problem that the DRP device 3 cannot use full USB PD function (caused by the adapter module 1 failing to recognize the VDM) may be overcome.

Shown in FIG. 2, the power processing unit 131 may be connected to the VBUS1 pin of the receptacle 11 and the VBUS2 pin of the plug 12 via VBUS'. Also shown, the power processing unit 131 may be connected to the microprocessor 132 via VCC. The power processing unit 131 may receive an initial power (such as 5V) from the VBUS1 pin or the VBUS2 pin, make the initial power into working power (such as 3.3V) for the microprocessor 132, and provide it to power the microprocessor 132.

Referring back to both FIG. 1 and FIG. 2, the power processing unit 131 may be connected to the pull-up resistance 14 via 5V, and subsequently connected to the CC2 pin of the plug 12 via the pull-up resistance 14. When the adapter module 1 acts as a power source role and connects with the DRP device 3, the power processing unit 131 outputs a configuration power (such as 5V) to the CC2 pin via the pull-up resistance 14. Then, according to the configuration power received by the DRP device 3, the DRP device 3 may recognize the information of the power source device 2, which is acted by the adapter module 1. This configuration power recognition technique is known in the USB Type-C interface, and therefore will not be further detailed here.

Figure 3:
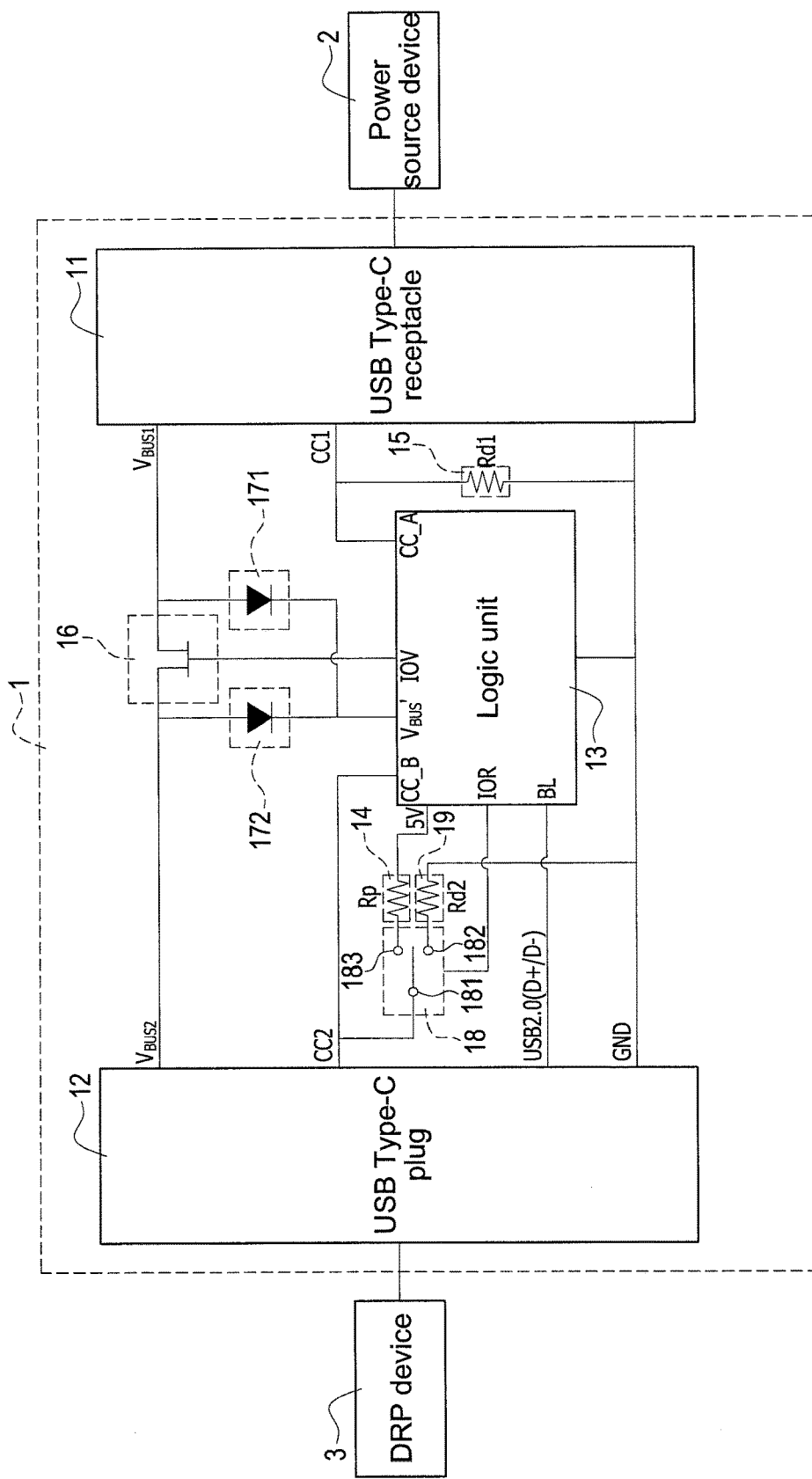
FIG. 3 shows a circuit diagram of an adapter module according to a second embodiment of the present invention.

Referring to FIG. 3, a second embodiment of the adapter module 1 is disclosed. A difference between the first embodiment and the second embodiment is that the adapter module 1 shown in the second embodiment can be first connected to the power source device 2, or alternatively, be first connected to the DRP device 3.

Shown in FIG. 3, the adapter module 1 further comprises a switching component 18, which comprises a first contact 181, a second contact 182 and a third contact 183. The first contact 181 may be connected to the CC2 pin of the plug 12, the second contact 182 may be connected to ground via a second pull-down resistance (Rd2) 19, the third contact 183 may be connected to the logic unit 13 via the pull-up resistance (Rp) 14. The switching component 18 comprises a control pin (not shown), and may be connected to the logic unit 13 via the control pin in order to receive control instructions from the logic unit 13.

The switching component 18 in the present embodiment may be preset with the first contact 181 in contact with the second contact 182, so as to make the CC2 pin of the plug 12 preset to connect to ground via the second pull-down resistance (Rd2) 19. If the adapter module 1 is first connected with the DRP device 3 via the plug 12, the DRP device 3 detects the second pull-down resistance (Rd2) 19 upon the CC2 pin and recognizes the adapter module 1 being a power sink due to the second pull-down resistance (Rd2) 19. In the meantime, the DRP device 3 starts to output to the adapter module 1 the initial power via the VBUS2 pin to activate the logic unit 13 inside the adapter module 1.

If the logic unit 13 is activated and the adapter module 1 is connected with the power source device 2 via the receptacle 11 afterward, the logic unit 13 acts in a manner similar to the operation of the first embodiment, which is to first receive from the power source device 2 the source capability and then turn the switch 16 on. Next, the logic unit 13 controls the switching component 18 via the control pin to disconnect the first contact 181 from the second contact 182 and switch to make the first contact 181 connect with the third contact 183, so as to make the CC2 pin of the plug 12 have connection with the logic unit 13 via the pull-up resistance (Rp) 14.

In the second embodiment, if the adapter module 1 is first connected with the power source device 2, the power source device 2 will act in a manner similar to the operation of the first embodiment, which is to detect the first pull-down resistance (Rd1) 15 upon the CC1 pin, and recognizes the adapter module 1 being a power sink due to the first pull-down resistance (Rd1) 15, so as to provide the initial power to the adapter module 1.

After being activated due to the initial power, the logic unit 13 receives from the power source device 2 the source capability, and turns on the switch 16, and controls the switching component 18 to disconnect the first contact 181 from the second contact 182 and switch to connect the first contact 181 with the third contact 183, so as to transform the adapter module 1 from the power sink to the power source. When the DRP device 3 is connected with the adapter module 1 at the time, it may detect the pull-up resistance (Rp) 14 upon the CC2 pin and recognize the adapter module 1 being a power source due to the pull-up resistance (Rp) 14, and perform communications with the adapter module 1.

Figure 4:
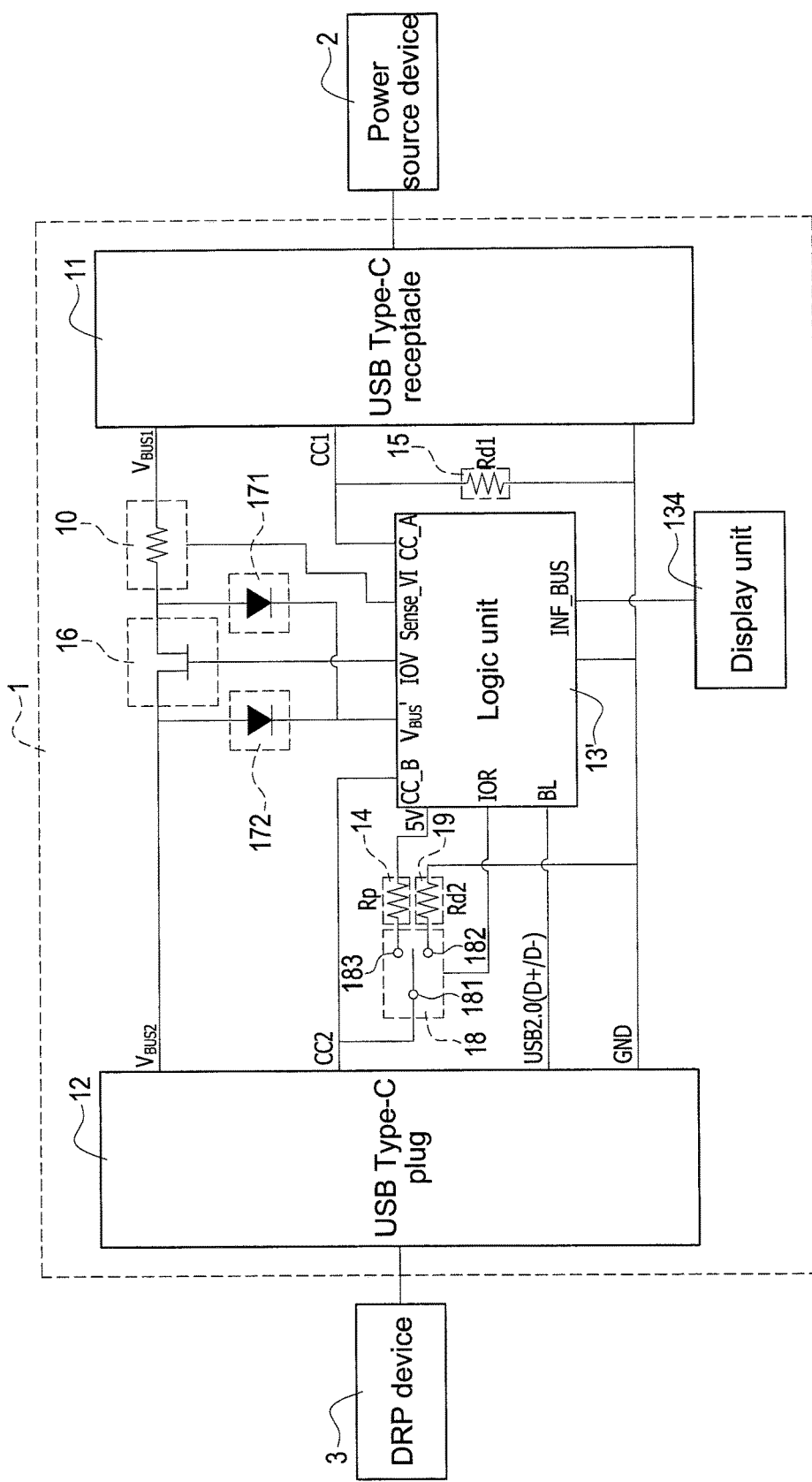
FIG. 4 shows a circuit diagram of an adapter module according to a third embodiment of the present invention.

Referring to FIG. 4, a third embodiment of the adapter module 1 is disclosed which further comprises a sensing component 10, and the adapter module 1 comprises a different logic unit 13' to the logic unit 13 of the previously described embodiments.

As shown in FIG. 4, the sensing component 10 is connected between the VBUS1 pin of the receptacle 11 and the switch 16, which may sense via the VBUS1 pin an output power provided by the power source device 2. In one embodiment, the sensing component 10 is a resistance having a connection to the logic unit 13'. The logic unit 13' may measure the output power from the power source device 2 via the sensing component 10, and determine if the output power satisfies the requirement of the DRP device 3 or if the output power exceeds a secure voltage/current that the DRP device 3 can endure.

If the logic unit 13' determines the output power is abnormal or unsuitable for the DRP device 3, it may turn off the switch 16 to disconnect the VBUS1 pin and the VBUS2 pin. Utilizing the sensing component 10, the power source device 2 and the adapter module 1 are prevented from providing unsuitable power to the DRP device 3 and potentially burning the DRP device 3 if the practical requirement of the DRP device 3 cannot be precisely recognized.

As shown in FIG. 4, the adapter module 1 further comprises a display unit 134 connected to the logic unit 13'. Also shown in the figure, the sensing component 10 may be connected to an analog/digital converting pin of the logic unit 13', which may transform an analog signal sensed via the sensing component 10 to a digital signal to be transmitted and displayed on the display unit 134. Therefore, an end-user may use the display unit 134 to directly obtain information regarding the output power (voltage value/current value) provided by the power source device 2.

Figure 5:
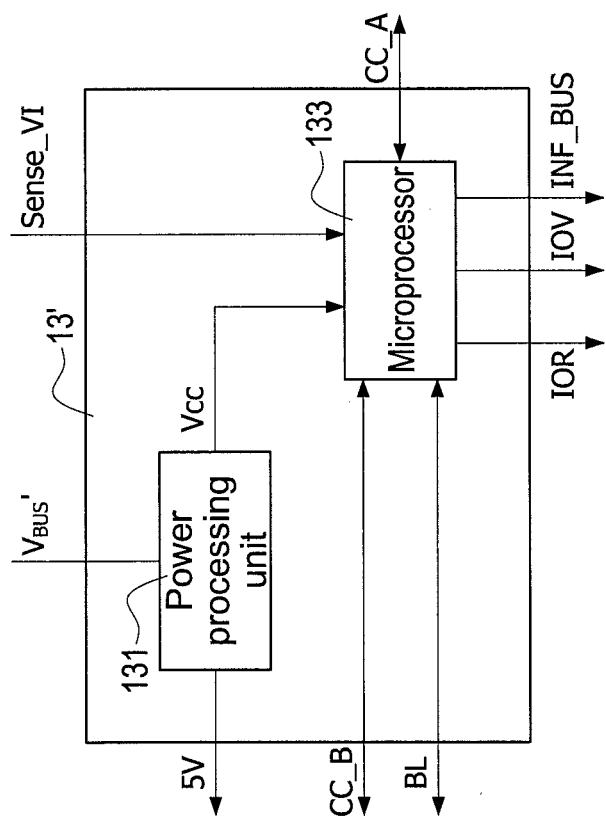
FIG. 5 shows a circuit diagram of a logic unit of the second embodiment of the present invention.

Referring to FIG. 5, the logic unit 13' comprises a power processing unit 131 and a microprocessor 133. The logic unit 13' further comprises a sense pin (Sense_VI) and an information pin (INF_BUS). The microprocessor 133 is connected to the sensing component 10 via the sense pin, and connected to the display unit 134 via the information pin. The microprocessor 133 is configured to transform an analog voltage/current value received from the sensing component 10 to digital information, and transmit the digital information to be displayed on the display unit 134.

Figure 6:
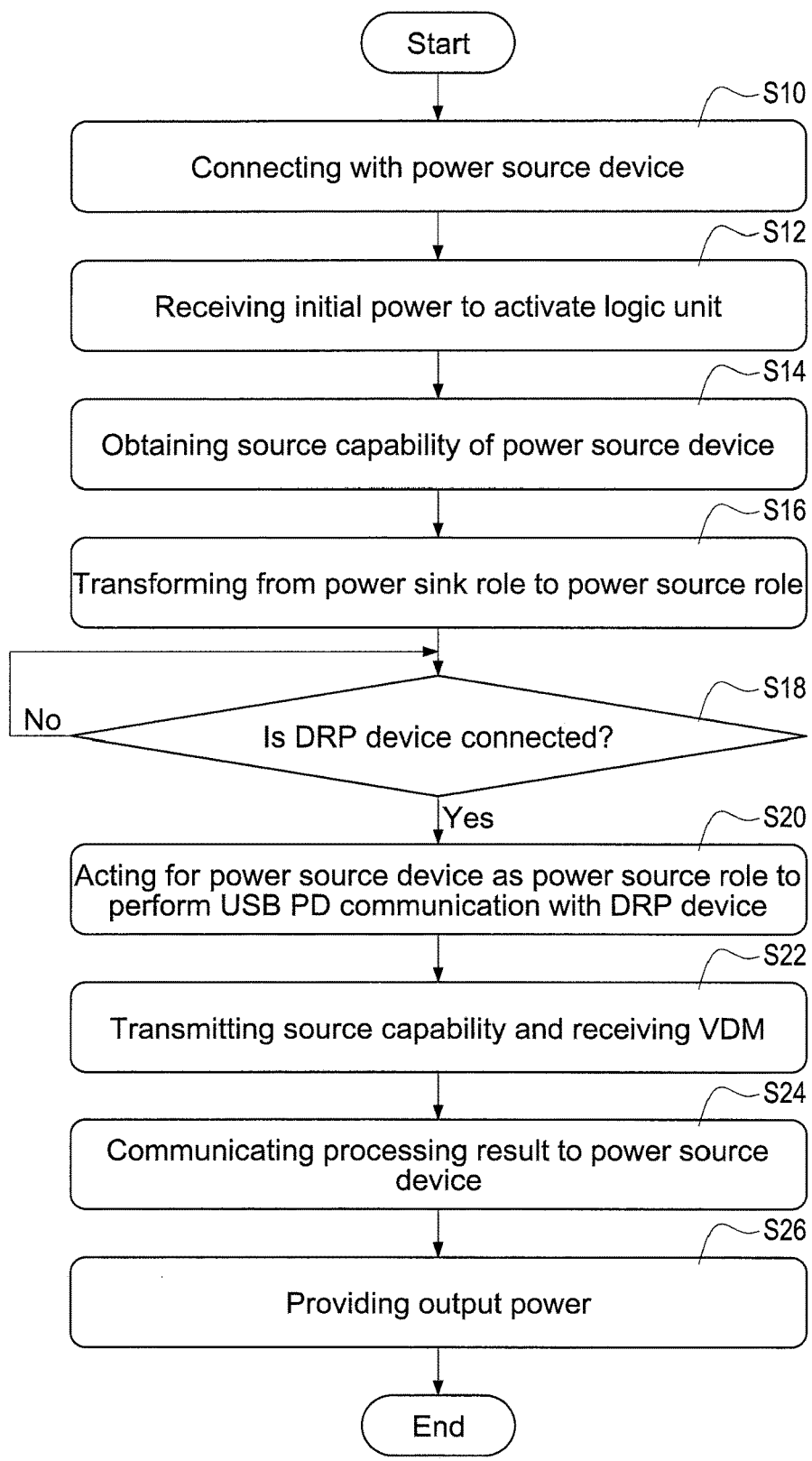
FIG. 6 shows an activating flowchart of the first embodiment of the present invention.

FIG. 6 shows steps of an adapter module activating method according to one embodiment of the present invention. First, the adapter module 1 is connected to the power source device 2 via the receptacle 11 (step S10). Next, an initial power is received from the power source device 2 to activate the logic unit 13, 13' (step S12). In this configuration, the adapter module 1 operates as a power sink role connected to the power source device 2. For example, the power source device 2 detects the first pull-down resistance 15 connected to the CC1 pin to recognize the adapter module 1 as a power sink.

Next, the logic unit 13, 13' communicates with the power source device 2 and obtains a source capability of the power source device 2 (step S14). Having received the source capability, the logic unit 13, 13' may then transform the adapter module 1 from a power sink role to a power source role (step S16). To do this, the logic unit 13 may actuate the switch 16 to enable a connection between the VBUS1 pin of the receptacle 11 and the VBUS2 pin of the plug 12. For embodiments shown in FIG. 3 and FIG. 4, the logic unit 13, 13' turns on the switch 16, disconnects the first contact 181 from the second contact 182 and connects the first contact 181 with the third contact 183. With such configurations, the CC2 pin of the plug 12 has connection with the logic unit 13, 13' via the pull-up resistance 14, and the adapter module 1 is able to operate as a power source.

After the step S16, the logic unit 13, 13' continues to determine if the DRP device 3 is connected (step S18), and is on standby for a connection with the DRP device 3.

If the DRP device 3 is connected, for example via the plug 12, the adapter module 1 operates as a power source, and may also act for the power source device 2, to perform a USB PD communication with the DRP device 3 (step S20). Specifically, the adapter module 1 may act for the power source device 2 by utilizing the logic unit 13, 13' to transmit the source capability of the power source device 2 to the DRP device 3 (step S22). The adapter module 1 is also configured to receive a VDM of the DRP device 3 from the DRP device 3 (step S22).

After the step S22, the adapter module 1 processes and analyzes the VDM using the logic unit 13, 13' (e.g. using the microprocessor 132, 133), and communicates the processing result to the power source device 2 (step S24). Examples of the processing result include identity, model, identification code, data type, electrical requirement of the DRP device 3.

After receiving the processing result, the power source device 2 may provide suitable output power according to the processing result. Accordingly, the adapter module 1 may start providing the output power to the DRP device 3 via the VBUS2 pin of the plug 12 (step S26).

Figure 7:
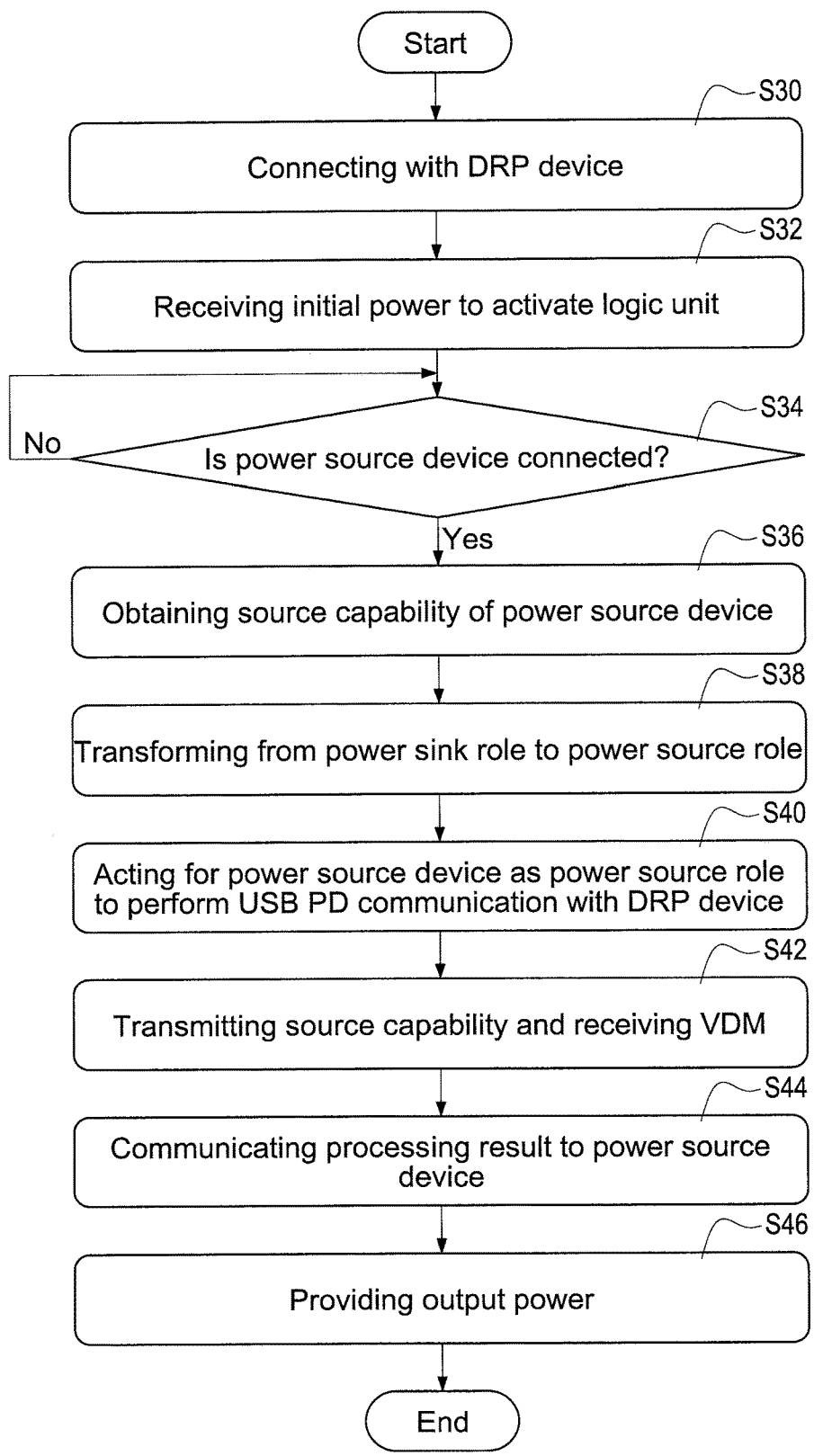
FIG. 7 shows an activating flowchart of the second embodiment of the present invention.

FIG. 7 shows steps of an adapter module activating method according to an alternative embodiment of the present invention. It should be mentioned that the adapter module 1 shown in FIG. 1 comprises the CC2 pin of the plug 12 which is connected to the logic unit 13 directly via the pull-up resistance (Rp) 14. If the adapter module 1 of FIG. 1 is first connected to the DRP device 3, the DRP device 3 would detect the pull-up resistance 14 and regard the adapter module 1 as a power source. In this scenario, the adapter module 1 would not be provided with the initial power and the logic unit 13 would not be activated.

Referring to the embodiment shown in FIG. 7, for activating the adapter module 1 shown in FIGS. 3 and 4, the adapter module 1 is first connected to the DRP device 3 via the plug 12 (step S30), and receives from the DRP device 3 the initial power to activate the logic unit 13, 13' (step S32). Specifically, the DRP device 3 detects the second pull-down resistance (Rd2) 19 which is preset to connect to the CC2 pin. The DRP device 3 thus regards the adapter module 1 as a power sink role.

After the step S32, the logic unit 13, 13' continues to determine if the power source device 2 is connected (step S34), and is on standby for a connection with the power source device 2. If the adapter module 1 is connected to the power source device 2, for example via the receptacle 11, the adapter module 1 operates as a power sink role to receive the source capability of the power source device 2 from the power source device 2 (step S36).

Next, having received the source capability, the logic unit 13, 13' may then transform the adapter module 1 from a power sink role to a power source role (step S38). Specifically, the logic unit 13, 13' actuates the switch 16 to enable a connection between the VBUS1 pin of the receptacle 11 and the VBUS2 pin of the plug 12, and disconnects the first contact 181 from the second contact 182 and connects the first contact 181 with the third contact 183. With such configurations, the CC2 pin of the plug 12 has connection with the logic unit 13, 13' via the pull-up resistance 14, and the adapter module 1 is able to operate as a power source.

Next, the adapter module 1 performs a USB PD communication with the DRP device 3 (step S40). The adapter module 1 may act for the power source device 2 by utilizing the logic unit 13, 13' to transmit the source capability of the power source device 2 to the DRP device 3 (step S42). The adapter module 1 is also configured to receive a VDM of the DRP device 3 from the DRP device 3 (step S42).

After the step S42, the adapter module 1 processes and analyzes the VDM using the logic unit 13, 13' (e.g. using the microprocessor 132, 133), and communicates the processing result to the power source device 2 (step S44). Examples of the processing result include identity, model, identification code, data type, electrical requirement of the DRP device 3.

After receiving the processing result, the power source device 2 may provide suitable output power according to the processing result. Accordingly, the adapter module 1 may start providing the output power to the DRP device 3 via the VBUS2 pin of the plug 12 (step S46).

As herein described in one or more embodiments of the present invention, the adapter module 1 is adopted between the power source device 2 and the DRP device 3 and the logic unit 13, 13' inside the adapter module 1 is utilized to act for the power source device 2 and perform USB PD communication with the DRP device 3. This may obviate issues with the DRP device 3 unable to use full USB PD functions due to the power source device 2 being too old of a type to recognize the VDM adopted by the DRP device 3. Accordingly, an end-user may only need to adopt the adapter module of embodiments of the present invention, instead of purchasing a new editions of the power source device, and save additional costs and resources.

As the skilled person will appreciate, changes and modifications can be made to the described embodiments, and the present disclosure is intended to include all such variations, modifications and equivalents which fall within the scope of the present invention as defined by the accompanying claims.

What is claimed is:
1. A USB Type-C adapter module, comprising:
a USB Type-C receptacle comprising a first power pin and a first configuration channel pin;
a USB Type-C plug comprising a second power pin, a second configuration channel pin, and a USB2.0 data pin;
a logic unit connected to the second configuration channel pin and the USB2.0 data pin, wherein the logic unit is configured to connect to the first power pin via a first diode, connect to the second power pin via a second diode, and receive an initial power for operation from the first power pin or the second power pin;
a pull-up resistance connected to the logic circuit and the second configuration channel pin;
a first pull-down resistance connected to the first configuration pin and configured to ground the first configuration pin;
a switch connected to the first power pin and the second power pin, the switch being configured to be actuated and transform the USB Type-C adapter module to a power sink role or a power source role;
wherein the USB Type-C adapter module is configured to connect with a power source device via the USB Type-C receptacle and, as the power sink role, receive a source capability from the power source device,
wherein the USB Type-C adapter module is further configured to connect with a dual role port (DRP) device via the USB Type-C plug and, as the power source role, perform a USB power delivery (PD) communication with the DRP device, and wherein the USB Type-C adapter module is configured to act for the power source device to transmit to the DRP device the source capability and further configured to receive from the DRP device a vendor defined message (VDM) when the USB Type-C adapter acts as the power source role.

2. The USB Type-C adapter module of claim 1, wherein the switch is a metal-oxide-semiconductor field-effect transistor (MOSFET).

3. The USB Type-C adapter module of claim 1, wherein the USB Type-C adapter module further comprises a switching component having a first contact, a second contact and a third contact; and wherein the first contact is configured to connect to the second configuration channel pin, the second contact is configured to connect to ground via a second pull-down resistance, and the third contact is configured to connect to the logic unit via the pull-up resistance.

4. The USB Type-C adapter module of claim 3, wherein the switching component is preset with the first contact in contact with the second contact; the second configuration channel pin is preset to connect to ground via the second pull-down resistance; and the DRP device is configured to detect the second pull-down resistance to regard the USB Type-C module being the power sink role, and output an initial power to the logic unit to operate via the second power pin when the USB Type-C adapter module is first connected to the DRP device.

5. The USB Type-C adapter module of claim 4, wherein the logic unit is configured to disconnect the first contact from the second contact; connect the first contact with the third contact after receiving the source capability from the power source device; and turn on the switch, so as to make the second configuration channel pin connect to the logic unit via the pull-up resistance, and wherein the DRP device is configured to detect the pull-up resistance to regard the USB Type-C adapter module being the power source role.

6. An activating method adopted by the USB Type-C adapter module of claim 3, comprising:
a) connecting to the DRP device via the USB Type-C plug to receive an initial power for activating the logic unit;
b) connecting to the power source device;
c) obtaining the source capability of the power source device;
d) transforming the USB Type-C adapter module from the power sink role to the power source role; and
e) acting for the power source device as the power source role to perform the USB PD communication with the DRP device.

7. The activating method of claim 6, further comprising:
presetting the switching component with the first contact in contact with the second contact;
connecting the second configuration channel pin to ground via the second pull-down resistance;
detecting the second pull-down resistance to regard the USB Type-C adapter module being the power sink role; and
providing the initial power.

8. The activating method of claim 7, wherein the step d) comprises:
turning on the switch to disconnect the first contact from the second contact;
connecting the first contact with the third contact;
connecting the second configuration channel pin to the logic unit via the pull-up resistance; and detecting the pull-up resistance to regard the USB Type-C adapter module being the power source role.

9. The USB Type-C adapter module of claim 1, wherein the logic unit comprises a microprocessor connecting with the first configuration channel pin, the second configuration channel pin, the switch and the USB2.0 data pin.

10. The USB Type-C adapter module of claim 9 wherein the microprocessor is configured to enter a device firmware upgrade (DFU) mode and accept a firmware updating action from the DRP device via the USB2.0 data pin when the USB Type-C adapter module is connected with the DRP device.

11. The USB Type-C adapter module of claim 9, wherein the logic unit further comprises a power processing unit connected with the first power pin, the second power pin and the microprocessor; and wherein the power processing unit is configured to receive an initial power from the first power pin or the second power pin, transform the initial power to a working power, and provide the working power to the microprocessor.

12. The USB Type-C adapter module of claim 11, wherein the initial power is 5V and the working power is 3.3V.

13. The USB Type-C adapter module of claim 11, wherein the power processing unit is connected to the pull-up resistance, and is configured to output a configuration power to the second configuration channel pin via the pull-up resistance when the USB Type-C adapter module acts the power source role and is connected to the DRP device.

14. The USB Type-C adapter module of claim 1, wherein the USB Type-C adapter module comprises a sensing component connecting between the first power pin and the switch, and wherein the sensing component is configured to sense an output power provided from the power source device.

15. The USB Type-C adapter module of claim 14, wherein the USB Type-C adapter module comprises a display unit, wherein the logic unit is connected to the sensing component and the display unit, wherein the logic unit is configured to transmit the output power, and wherein the display unit is configured to display an output power information of the output power.

16. An activating method adopted by the USB Type-C adapter module of claim 1, comprising:
a) connecting to the power source device via the USB Type-C receptacle to receive an initial power for activating the logic unit;
b) obtaining the source capability of the power source device by the logic unit;
c) transforming the USB Type-C adapter module from the power sink role to the power source role;
d) connecting to the DRP device via the USB Type-C plug; and
e) acting as the power source role for the power source device to perform the USB PD communication with the DRP device.

17. The activating method of claim 16, wherein the step e) comprises transmitting the source capability of the power source device to the DRP device and receiving from the DRP device a vendor defined message (VDM).

18. The activating method of claim 17, further comprising:
providing a switching component having a first contact, a second contact and a third contact;
connecting the first contact to the second configuration channel pin;
connecting the second contact to ground via a second pull-down resistance;

connecting the third contact to the logic unit via the pull-up resistance, presetting the switching component with the first contact in contact with the second contact, turning on the switch to disconnect the first contact from the second contact connecting the first contact with the third contact; and connecting the second configuration channel pin to the logic unit via the pull-up resistance.

* * * * *